United States Patent
Seong et al.

(10) Patent No.: US 10,074,881 B2
(45) Date of Patent: Sep. 11, 2018

(54) BATTERY MODULE HAVING INDIRECT AIR-COOLING STRUCTURE

(71) Applicant: LG CHEM, LTD., Seoul (KR)

(72) Inventors: Jun Yeob Seong, Daejeon (KR); Yong Seok Choi, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 686 days.

(21) Appl. No.: 14/535,872

(22) Filed: Nov. 7, 2014

(65) Prior Publication Data

US 2015/0064535 A1 Mar. 5, 2015

Related U.S. Application Data

(63) Continuation of application No. PCT/KR2013/005582, filed on Jun. 25, 2013.

(30) Foreign Application Priority Data

Jul. 12, 2012 (KR) .................. 10-2012-0076308

(51) Int. Cl.
*H01M 10/613* (2014.01)
*H01M 10/656* (2014.01)
*H01M 10/6563* (2014.01)
*H01M 10/647* (2014.01)
*B60L 11/18* (2006.01)
*H01M 10/6551* (2014.01)
*H01M 10/6555* (2014.01)
(Continued)

(52) U.S. Cl.
CPC ..... *H01M 10/5004* (2013.01); *B60L 11/1864* (2013.01); *B60L 11/1874* (2013.01); *B60L 11/1879* (2013.01); *H01M 10/613* (2015.04); *H01M 10/647* (2015.04); *H01M 10/6551* (2015.04); *H01M 10/6555* (2015.04); *H01M 10/6563* (2015.04); *B60K 11/06* (2013.01); *B60K 2001/005* (2013.01);
(Continued)

(58) Field of Classification Search
None
See application file for complete search history.

(56) References Cited

U.S. PATENT DOCUMENTS 7,968,223 B2 6/2011 Lee et al.
8,383,260 B2 2/2013 Essinger et al.
(Continued)

FOREIGN PATENT DOCUMENTS

CN 102170034 A 8/2011
DE 10 2007 052 375 A1 5/2009
(Continued)

OTHER PUBLICATIONS

International Search Report issued in PCT/KR2013/005582, dated Oct. 24, 2013.

*Primary Examiner* — Barbara L Gilliam
*Assistant Examiner* — Adam A Arciero
(74) *Attorney, Agent, or Firm* — Birch, Stewart, Kolasch & Birch, LLP

(57) ABSTRACT

A battery module including two or more stacked battery cells which can be charged and discharged and at least one cooling plate comprising a thermal conduction portion and at least one heat dissipation portion connected to said thermal conduction portion, the thermal conduction portion being disposed between one or more adjacent battery cells, and the at least one heat dissipation portion extending beyond the adjacent battery cells and including one or more bend is provided.

19 Claims, 3 Drawing Sheets

(51) Int. Cl.
  *B60K 11/06*      (2006.01)
  *B60K 1/00*       (2006.01)
  *H01M 10/04*      (2006.01)
  *H01M 2/10*       (2006.01)
  *H01M 10/6566*    (2014.01)

(52) U.S. Cl.
  CPC ........ *H01M 2/1072* (2013.01); *H01M 2/1077* (2013.01); *H01M 10/0413* (2013.01); *H01M 10/0436* (2013.01); *H01M 10/0481* (2013.01); *H01M 10/6566* (2015.04); *H01M 2220/20* (2013.01); *Y02T 10/7005* (2013.01); *Y02T 10/7061* (2013.01)

(56) References Cited

U.S. PATENT DOCUMENTS

| | | |
|---|---|---|
| 8,563,155 B2 | 10/2013 | Lee et al. |
| 2006/0216582 A1 | 9/2006 | Lee et al. |
| 2007/0042264 A1* | 2/2007 | Desilvestro ............. H01M 2/08 429/152 |
| 2008/0193830 A1* | 8/2008 | Buck ................... H01M 2/1077 429/120 |
| 2010/0330408 A1* | 12/2010 | Yoon ................... H01M 2/0262 429/120 |
| 2011/0059347 A1* | 3/2011 | Lee ......................... B60L 11/18 429/120 |
| 2011/0064985 A1* | 3/2011 | Lee ..................... H01M 2/1077 429/120 |
| 2011/0189523 A1 | 8/2011 | Eom |
| 2012/0040222 A1 | 2/2012 | Quick et al. |
| 2012/0171532 A1 | 7/2012 | Lee et al. |
| 2012/0177965 A1 | 7/2012 | Lee et al. |

FOREIGN PATENT DOCUMENTS

| | | |
|---|---|---|
| DE | 10 2010 012 934 A1 | 9/2011 |
| KR | 10-2006-0102855 A | 9/2006 |
| KR | 10-2011-0063007 A | 6/2011 |
| KR | 10-1095346 B1 | 12/2011 |

\* cited by examiner

[FIG. 1]
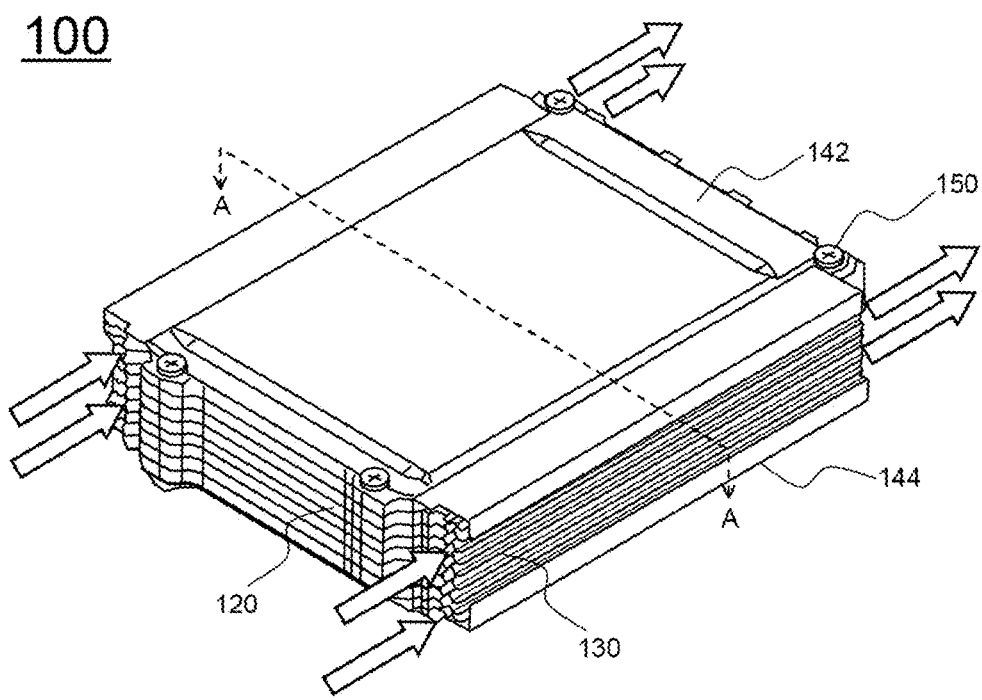

[FIG. 2]
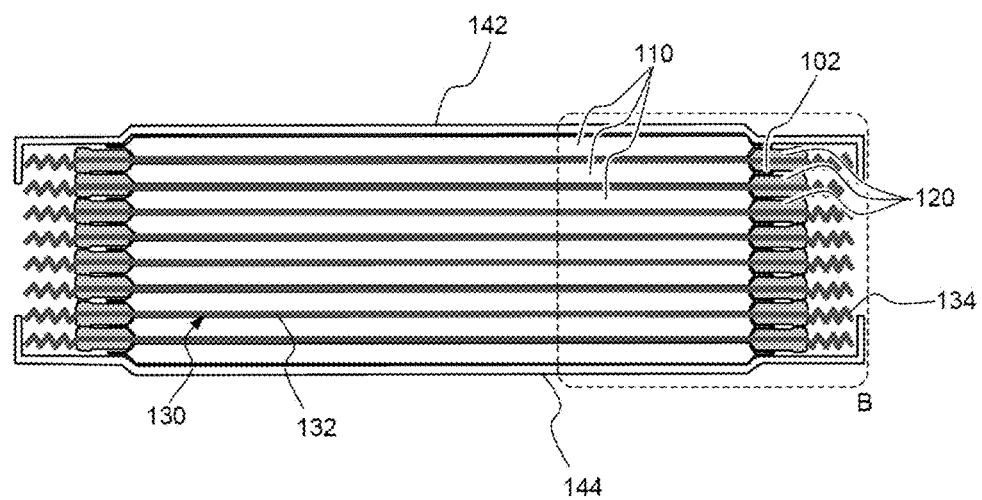
[FIG. 3]
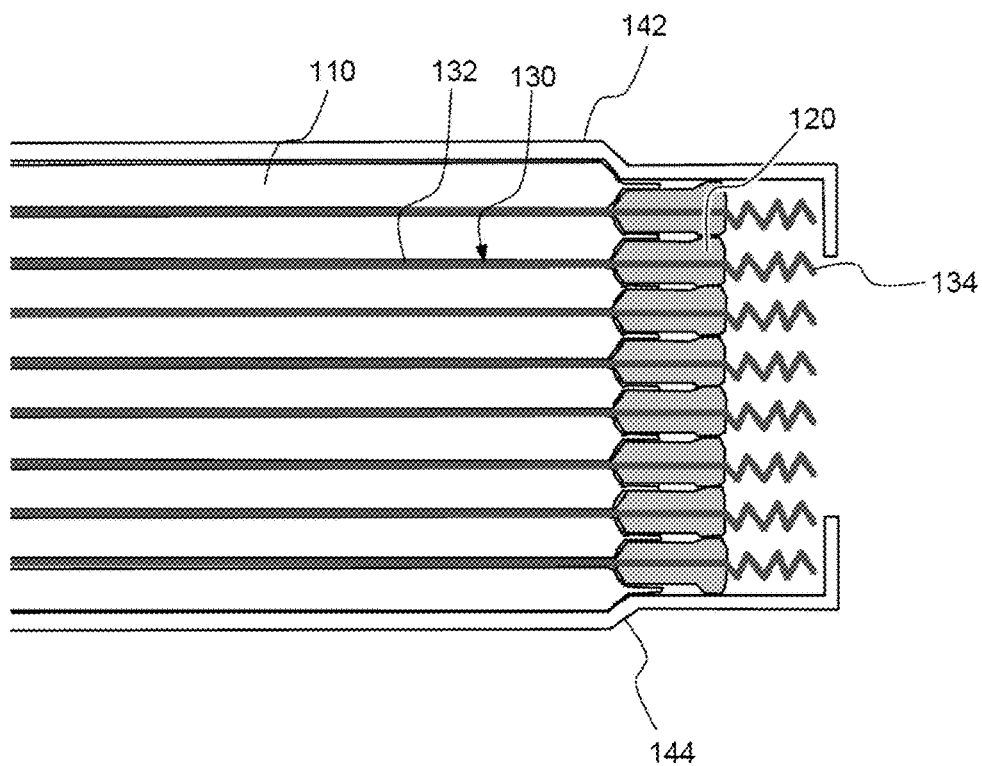

【FIG. 4】
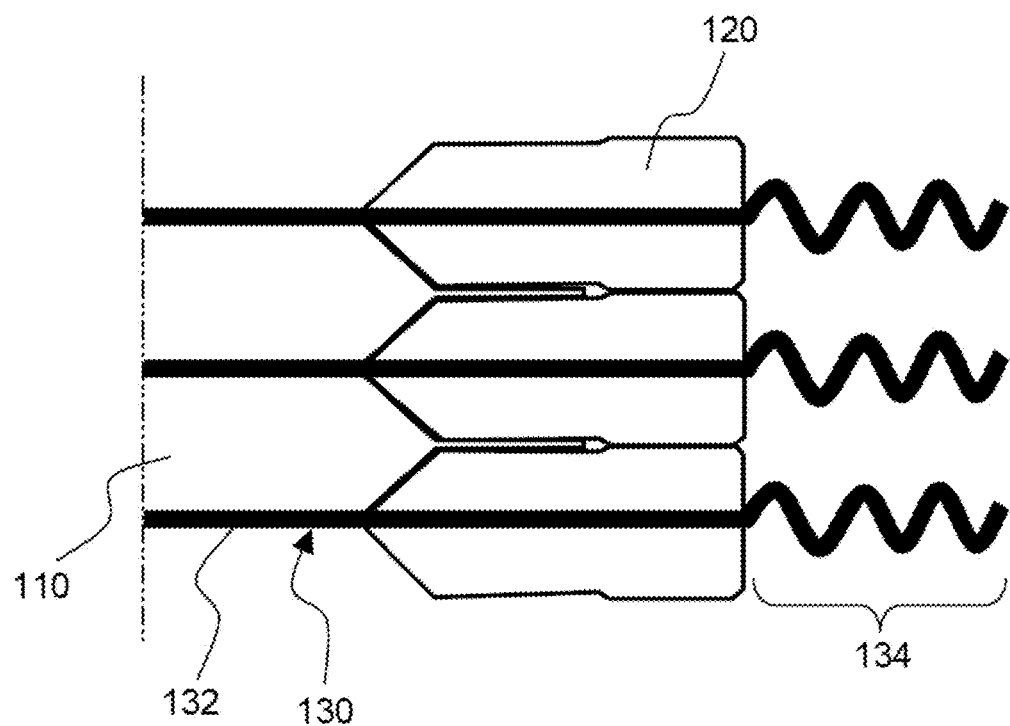

BATTERY MODULE HAVING INDIRECT AIR-COOLING STRUCTURE

CROSS REFERENCE TO RELATED APPLICATIONS

This application is a Continuation of PCT International Application No. PCT/KR2013/005582, filed on Jun. 25, 2013, which claims priority under 35 U.S.C. 119(a) to Patent Application No. 10-2012-0076308, filed in Korea on Jul. 12, 2012, all of which are hereby expressly incorporated by reference into the present application.

TECHNICAL FIELD

The present invention relates to a battery module including an indirect air-cooling structure and, more particularly, to a battery module including two or more stacked battery cells which can be charged and discharged and cartridges for fixing the respective battery cells to form a battery cell stack structure, wherein each of the cartridges is provided with a cooling plate having one end, as a thermal conduction part, disposed between the respective battery cells and the other end, as a heat dissipation part, protruding outward from each of the cartridges.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting such a middle or large-sized battery module may be secondary batteries which can be charged and discharged. Consequently, a larger amount of heat is generated from such high-output, large-capacity secondary batteries during charge and discharge of the secondary batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a battery pack, which is a high-output, large-capacity battery, needs a cooling system to cool battery cells mounted therein.

A battery module mounted in a middle or large-sized battery pack is generally manufactured by stacking a plurality of battery cells with high integration. In this case, the battery cells are stacked with the battery cells arranged at predetermined intervals such that heat generated from the battery cells during charge and discharge of the battery cells can be removed. For example, the battery cells may be sequentially stacked with the battery cells arranged at predetermined intervals without using an additional member. Alternatively, for battery cells having low mechanical strength, one or more battery cells may be mounted in a cartridge and then a plurality of cartridges may be stacked to constitute a battery module. Coolant channels are defined between the stacked battery cells or between the stacked battery modules so that heat accumulated between the stacked battery cells or between the stacked battery modules can be effectively removed.

In this structure, however, a plurality of coolant channels corresponding to a plurality of battery cells are needed with the result that the overall size of the battery module is increased.

In addition, when a plurality of battery cells is stacked, a plurality of parts related to a cooling structure is further included with the result that the volume of the battery module is increased. Furthermore, a manufacturing process of the battery module is complicated and, therefore, manufacturing cost of the battery module is also greatly increased.

SUMMARY OF THE INVENTION

Therefore, one object of the present invention is made to solve the above problems and other technical problems that have yet to be resolved.

Specifically, it is an object of the present invention to provide a battery module having a compact structure that is capable of effectively removing heat generated from a battery cell without using a large number of members.

It is another object of the present invention to provide a battery module exhibiting excellent safety and manufacturing processability while providing high-output, large-capacity power.

In accordance with one aspect of the present invention, the above and other objects can be accomplished by the provision of a battery module including two or more stacked battery cells which can be charged and discharged and at least one cooling plate including a thermal conduction portion and at least one heat dissipation portion connected to the thermal conduction portion, the thermal conduction portion being disposed between one or more adjacent battery cells, and the at least one heat dissipation portion extending beyond the adjacent battery cells and including one or more bend.

That is, the battery module according to the present invention is configured to have a structure in which heat generated from the battery cells is transferred to the thermal conduction portion disposed between the adjacent battery cells and the heat dissipation portion extending beyond the adjacent battery cells discharge heat from the thermal conduction part to the outside to perform cooling.

In a conventional battery module, heat generated from the battery cells is transferred to cooling fins or cooling members having coolant channels mounted at the outside of the battery module via the cooling plates such that the cooling fins or the cooling members can perform cooling in an air or water cooling fashion.

In the above structure, however, the number of parts is increased, a process of interconnecting the cooling plates and the cooling fins or the cooling members by welding or fastening is further included. As a result, manufacturing cost of the battery module is increased and a manufacturing process of the battery module is complicated.

In the battery module according to the present invention, on the other hand, a process of dissipating heat generated from the battery cells through heat transfer to cool the battery cells is performed by the at least one cooling plate including the heat dissipation portion and the cooling plate is easily manufactured while being configured to have a simple structure. Consequently, it is possible for the battery module to exhibit high cooling efficiency without using a large number of members.

Consequently, it is possible to effectively dissipating heat generated from the battery cells to the outside without using a conventional cooling system. As a result, it is possible to improve assembly processability and, in addition, to configure a very compact battery module.

According to circumstances, each of the cooling plates may include a thermal conduction portion disposed between the respective battery cells and heat dissipation portions formed at opposite ends of the thermal conduction portion. That is, the structure of each of the cooling plates is not particularly restricted so long as the thermal conduction portion and the heat dissipation portions constituting each of the cooling plates are integrally formed.

In a preferred example, each of the battery cells may be a plate-shaped battery cell that is capable of providing a high stacking rate in a limited space. The plate-shaped battery cell may be configured to have a structure in which a cathode terminal and an anode terminal protrude from one side of a battery cell body thereof or a structure in which a cathode terminal protrudes from one side of a battery cell body thereof and an anode terminal protrudes from the opposite side of the battery cell body thereof.

For example, the plate-shaped battery cell may be a pouch-shaped battery cell configured to have a structure in which an electrode assembly is mounted in a battery case made of a laminate sheet including a resin layer and a metal layer.

Specifically, the plate-shaped battery cell may be a pouch-shaped battery cell configured to have a structure in which an electrode assembly of a cathode, separator, and anode structure is received in a battery case together with an electrolyte in a sealed state. For example, each of the battery cells may be a plate-shaped battery cell configured to have an approximately rectangular hexahedral structure having a small thickness to width ratio. Generally, the pouch-shaped battery cell includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member and upper and lower contact regions of the outer circumference of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein.

The pouch-shaped battery cells are stacked in a state in which the pouch-shaped battery cells are fixed by the respective cartridges. Specifically, an outer circumferential sealed portion of each of the pouch-shaped battery cells is fixed between corresponding ones of the cartridges in a pressed state such that the pouch-shaped battery cells are fixed to the respective cartridges.

The structure of the cooling plate is not particularly restricted so long as the cooling plate is a thin member exhibiting thermal conductivity. For example, the cooling plate may be a sheet made of a metal material. The metal material may be aluminum or an aluminum alloy, which exhibits high thermal conductivity and is lightweight. However, the present invention is not limited thereto.

In a preferred example, the heat dissipation portion of the cooling plate may be repeatedly bent to provide the one or more bend such that the area of the heat dissipation portion contacting external air is increased. In the above structure, the area of the heat dissipation portion contacting external air is increased based on the wide surface area of the heat dissipation portion in a limited space to improve a heat dissipation effect.

In a concrete example, the one or more bend structure may be formed in the shape of bellows. The bent width and height of the one or more bend structure are not particularly restricted and may be properly adjusted based on a given space.

The battery module may further include a first plate and a second plate mounted at outermost battery cells of the battery cell stack structure for fixing the battery cell stack structure, the at least one cooling plate may include a plurality of cooling plates and the first plate and the second plate may be bent to cover the heat dissipation portions of the cooling plates.

In a concrete example, the first plate may be located at the top of the battery cell stack structure, the second plate may be located at the bottom of the battery cell stack structure, and the battery cell stack structure is fixed between the first plate and the second plate in a pressed state. In addition, ends of the first plate and the second plate are bent downward and upward to cover the heat dissipation portions of the cooling plates protruding outward such that the heat dissipation portions of the cooling plates can be protected from the outside.

As previously described, each of the battery cells may be configured to have a structure in which a cathode terminal and an anode terminal protrude from one side of an outer circumference thereof or a structure in which a cathode terminal protrudes from one side of the outer circumference thereof and an anode terminal protrudes from the opposite side of the outer circumference thereof. In this case, it is preferably for the heat dissipation portion of the cooling plate to protrude from a side of the outer circumference of each of the battery cells at which the cathode terminal and the anode terminal are not located. For example, the heat dissipation portions of each of the cooling plates may protrude from two opposite sides of the outer circumference of each of the battery cells adjacent to one side of the outer circumference of each of the battery cells at which the cathode terminal and/or the anode terminal are formed.

Meanwhile, the battery module may further include a cooling fan for driving a coolant such that the coolant passes through the heat dissipation portion of the cooling plate in order to improve cooling efficiency. The coolant may be air. However, the present invention is not limited thereto.

The outer circumference of the thermal conduction portion of the cooling plate may be coupled to a corresponding one of the cartridges using various methods, such as fastening, assembly, fusing, and bonding. Preferably, the outer circumference of the thermal conduction portion of the cooling plate may be integrally coupled to a corresponding one of the cartridges by insert injection molding.

In accordance with another aspect of the present invention, the battery module may include at least one cartridge for fixing the respective battery cells to form a battery cell stack structure.

In a concrete example, the at least one cartridge includes a plurality of cartridges and the at least one cooling plate includes a plurality of cooling plates. Each of the cooling plates being associated with a corresponding cartridge of the plurality of cartridges. For each cooling plate, an outer circumference of the thermal conduction portion of the cooling plate may be integrally coupled to the corresponding cartridge of the plurality of cartridges by fusing, assembly, or insert injection molding.

Each of the battery cells is not particularly restricted so long as each of the battery cells is a secondary battery that is capable of providing high voltage and high current when a battery module or a battery pack is constituted by the battery cells. For example, each of the battery cells may be a lithium secondary battery having a large energy storage capacity per volume.

In accordance with another aspect of the present invention, there is provided a battery pack including the battery module with the above-stated construction as a unit module.

The battery pack may be manufactured by combining battery modules as unit modules based on desired power and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

In accordance with a further aspect of the present invention, there is provided a device including the battery pack with the above-stated construction as a power source. Specifically, the device may be an electric vehicle, a hybrid electric vehicle, a plug-in hybrid electric vehicle, or a power storage device.

The structure and manufacturing method of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a battery module according to an embodiment of the present invention;

FIG. 2 is a sectional view taken along line A-A of FIG. 1;

FIG. 3 is an enlarged view showing region B of FIG. 2; and

FIG. 4 is an enlarged view showing outer regions of cartridges of FIG. 3.

DETAILED DESCRIPTION OF THE EMBODIMENTS

Now, preferred embodiments of the present invention will be described in detail with reference to the accompanying drawings. It should be noted, however, that the scope of the present invention is not limited by the illustrated embodiments.

FIG. 1 is a typical view showing a battery module according to an embodiment of the present invention and FIG. 2 is a sectional view taken along line A-A of FIG. 1.

Referring to these drawings, a battery module 100 is configured to have a structure including a plurality of battery cells 110, a plurality of cartridges 120, a plurality of cooling plates 130, and first and second plates 142 and 144.

The battery cells 110 may be two or more plate-shaped battery cells, such as pouch-shaped battery cells, which can be charged and discharged. The battery cells 110 are stacked. The cartridges 120 fix the respective battery cells 110 to form a battery cell stack structure. That is, outer circumferential sealed portions, which are thermally bonded, of the pouch-shaped battery cells 110 are disposed between the respective cartridges 120 in a pressed state such that the pouch-shaped battery cells 110 are fixed to the respective cartridges 120.

Each of the cooling plates 130 includes a thermal conduction part 132 disposed between the respective battery cells 110 such that heat generated from the battery cells 110 is transferred to the thermal conduction part 132 and heat dissipation parts 134 protruding outward from a corresponding one of the cartridges 120 for discharging heat from the thermal conduction part 132 to the outside to perform cooling. Each of the cooling plates 130 is made of an aluminum sheet which exhibits high thermal conductivity and lightweight.

The first plate 142 and the second plate 144 are mounted at the outermost battery cells to fix the battery cell stack structure. Specifically, fastening holes are formed at the first plate 142, the second plate 144, and the cartridges 120 such that the battery cell stack structure between the first plate 142 and the second plate 144 is fixed using fastening members 150, such as fixing screws, extending through the fastening holes.

Each of the battery cells 110 is configured to have a structure in which a cathode terminal and an anode terminal protrude from one side of the outer circumference thereof or a structure in which a cathode terminal protrudes from one side of the outer circumference thereof and an anode terminal protrudes from the opposite side of the outer circumference thereof. The heat dissipation parts 134 of each of the cooling plates 130 protrude from the remaining sides of the outer circumference of each of the battery cells 110 at which the cathode terminal and the anode terminal are not located. That is, the heat dissipation parts 134 of each of the cooling plates 130 protrude from two opposite sides of the outer circumference of each of the battery cells 110 adjacent to one side of the outer circumference of each of the battery cells 110 at which the cathode terminal and the anode terminal are formed.

Although the heat dissipation parts 134 are shown as protruding from two opposite sides of the outer circumference of each of the battery cells 110 adjacent to one side of the outer circumference of each of the battery cells 110 at which the cathode terminal and the anode terminal are formed in the drawings, the present invention is not limited thereto. According to circumstances, the heat dissipation part 134 may protrude from another side of the outer circumference of each of the battery cells 110 at which the cathode terminal and the anode terminal are not formed. Alternatively, the heat dissipation part 134 may protrude from a portion of each side and/or one side of the outer circumference of each of the battery cells 110 at which the cathode terminal and the anode terminal are not formed.

Meanwhile, a cooling fan for driving air such that the air passes through the heat dissipation parts 134 of the cooling plates 130 may be provided at the outside of the battery module 100 in order to improve cooling efficiency.

FIG. 3 is an enlarged view showing region B of FIG. 2. Referring to FIG. 3, the first plate 142 and the second plate 144 for fixing the battery cell stack structure extend outward from the cartridges 120 and ends of the first plate 142 and the second plate 144 are bent downward and upward to cover the heat dissipation parts 134 of the cooling plates 130 such that the heat dissipation parts 134 of the cooling plates 130 can be protected from the outside.

In addition, the outer circumferential sealed portion of each of the battery cells 110 is fixed by the a corresponding one of the cartridges 120 when the outer circumferential sealed portion of each of the battery cells 110 is not in contact with corresponding ones of the cooling plates 130. Consequently, it is not necessary to form a structure for additionally insulating the outer circumferential sealed portion of each of the battery cells 110.

FIG. 4 is an enlarged view showing outer regions of the cartridges of FIG. 3. Referring to FIG. 4, the cooling plates 130 are integrally formed with the respective cartridges 120 by insert injection molding and then disposed between the respective battery cells 110. In this structure, the cartridges 120 stably fix the battery cells 110 while having improved strength against twist.

Referring to FIG. 4, the cooling plates 130 are integrally coupled to the respective cartridges 120 and then disposed between the respective battery cells 110. In this structure, the cartridges 120 have improved strength against twist. Consequently, the battery module may have a more compact structure than a conventional battery module having the same strength. In addition, the cartridges 120 may stably fix the battery cells 110.

Coupling between the cooling plates 130 and the cartridges 120 may be achieved by, for example, insert injection molding. However, the present invention is not limited thereto. For example, coupling between the cooling plates 130 and the cartridges 120 may be achieved using various methods, such as assembly and fusing.

In addition, the heat dissipation parts 134 of the cooling plates 130 are repeatedly bent such that the area of the heat dissipation parts 134 contacting external air is increased. The bent structure of the heat dissipation parts 134 increases the contact area between the heat dissipation parts 134 and external air, thereby improving heat dissipation efficiency.

Therefore, embodiments of the present invention provides a battery module which can be manufactured to have a simple and compact structure while providing high-output, large-capacity power and exhibits excellent lifespan characteristics and safety based on high cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As is apparent from the above description, in the battery module according to the present invention, a process of dissipating heat generated from the battery cells through heat transfer to cool the battery cells is performed by the cooling plates including the heat dissipation parts and the cooling plates are easily manufactured while being configured to have a simple structure. Consequently, it is possible for the battery module to exhibit high cooling efficiency without using a large number of members.

In addition, the heat dissipation parts are repeatedly bent such that the area of the heat dissipation parts contacting external air is maximized to improve cooling efficiency. Furthermore, the cartridges and the cooling plates are integrally formed by injection molding. Consequently, it is possible to improve structural stability of the battery cell stack structure in which the battery cells are stacked in a state in which the battery cells are fixed to the respective cartridges.

The invention claimed is:

1. A battery module comprising:
    two or more stacked battery cells which can be charged and discharged;
    at least one cooling plate comprising:
        a thermal conduction portion; and
        at least one heat dissipation portion connected to the thermal conduction portion, the thermal conduction portion being disposed between one or more adjacent battery cells, and the at least one heat dissipation portion extending beyond said adjacent battery cells and including a plurality of bends; and
    at least one cartridge for fixing the respective battery cells to form a battery cell stack structure, the at least one cartridge encircling a perimeter of an adjacent battery cell of the one or more adjacent battery cells, the at least one cartridge extending between two adjacent battery cells within the battery cell stack structure,
    wherein the at least one heat dissipation portion extends from a side of the at least one cartridge.

2. The battery module according to claim 1, wherein each of the battery cells is a plate-shaped battery cell and the battery cells are stacked such that one side or opposite sides of one battery cell face a corresponding side or corresponding sides of another adjacent battery cell(s).

3. The battery module according to claim 2, wherein the plate-shaped battery cell is a pouch-shaped battery cell configured to have a structure in which an electrode assembly is mounted in a cell case made of a laminate sheet comprising a resin layer and a metal layer and an outer circumference of the cell case is sealed.

4. The battery module according to claim 3, wherein an outer circumferential sealed portion of the pouch-shaped battery cell is fixed between two cartridges.

5. The battery module according to claim 1, wherein the cooling plate is a sheet made of a metal material.

6. The battery module according to claim 5, wherein the metal material is aluminum or an aluminum alloy.

7. The battery module according to claim 1, wherein the heat dissipation portion of the cooling plate is repeatedly bent in a corrugated form to provide the plurality of bends.

8. The battery module according to claim 1, wherein each of the battery cells is configured to have a structure in which a cathode terminal and an anode terminal protrude from one side of an outer circumference thereof or a structure in which a cathode terminal protrudes from one side of the outer circumference thereof and an anode terminal protrudes from the opposite side of the outer circumference thereof.

9. The battery module according to claim 8, wherein the heat dissipation portion of the cooling plate protrudes from a side of the outer circumference of each of the battery cells at which the cathode terminal and the anode terminal are not located.

10. The battery module according to claim 1, further comprising a cooling fan for driving a coolant such that the coolant passes through the heat dissipation portion of the cooling plate.

11. The battery module according to claim 10, wherein the coolant is air.

12. The battery module according to claim 1, wherein the at least one cartridge includes a plurality of cartridges,
wherein the at least one cooling plate includes a plurality of cooling plates, each of the cooling plates being associated with a corresponding cartridge of the plurality of cartridges.

13. The battery module according to claim 12, wherein, for each cooling plate, a portion of the heat dissipation portion of the cooling plate is integrally coupled to the corresponding cartridge of the plurality of cartridges by fusing, assembly, or insert injection molding.

14. The battery module according to claim 1, wherein each of the battery cells is a lithium secondary battery.

15. The battery module according to claim 1, wherein the at least one heat dissipation portion includes a pair of heat dissipation portions formed at opposite ends of the thermal conduction portion.

16. A battery pack comprising a battery module according to claim 1 as a unit module.

17. A device comprising a battery pack according to claim 16.

18. The device according to claim 17, wherein the device is an electric vehicle, a hybrid electric vehicle, a plug-in hybrid electric vehicle, or a power storage device.

19. A battery module comprising:
two or more stacked battery cells which can be charged and discharged, the two or more stacked battery cells defining a battery cell stack structure;
at least one cooling plate comprising:
a thermal conduction portion; and
at least one heat dissipation portion connected to the thermal conduction portion, the thermal conduction portion being disposed between one or more adjacent battery cells, and the at least one heat dissipation portion extending beyond said adjacent battery cells and including one or more bend; and
a first plate and a second plate mounted at opposite, outermost battery cells of the battery cell stack structure for fixing the battery cell stack structure between the first plate and the second plate,
wherein the at least one cooling plate includes a plurality of cooling plates,
wherein the first plate and the second plate are bent to cover one or more of the heat dissipation portions of the cooling plates from opposite sides of the battery cell stack structure, and
wherein one or more of the heat dissipation portions are not covered by the first plate and the second plate.

* * * * *